(12) United States Patent
Stevens

(10) Patent No.: US 8,218,967 B1
(45) Date of Patent: Jul. 10, 2012

(54) OPTICAL SWITCHING SYSTEMS AND METHODS

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 427 days.

(21) Appl. No.: 12/476,720

(22) Filed: Jun. 2, 2009

(51) Int. Cl.
*H04B 10/04* (2006.01)
*H04B 10/00* (2006.01)
*G02B 6/35* (2006.01)
*H04J 14/00* (2006.01)

(52) U.S. Cl. ............... 398/55; 398/42; 398/45; 398/46; 385/17

(58) Field of Classification Search .............. 398/45, 398/55
See application file for complete search history.

(56) References Cited

U.S. PATENT DOCUMENTS 6,307,653 B1 * 10/2001 Bala et al. .................. 398/2
2002/0034354 A1 * 3/2002 Hayashi et al. ............ 385/17

OTHER PUBLICATIONS

Xiaohua "Optical Switching Technology Comparison: Optical MEMS vs.Other Technologies".*
Yadav "Survey and Comparison of Optical Switch Fabrication Techniques and Architectures".*
Aleksic "Power Consumption Issues in Future High-Performance Switches and Routers".*
Aleksic "Analysis of Power Consumption in Future High-Capacity Network Nodes".*
Leenheer "Performance Analysis of a Hybrid Optical Switch".*
Leenheer "Dimensioning of Combined OBS/OCS Networks".*
Papadimitriou "Optical Switching: Switch Fabrics, Techniques, and Architectures".*

* cited by examiner

*Primary Examiner* — Shi K Li
*Assistant Examiner* — Oommen Jacob
(74) *Attorney, Agent, or Firm* — Hamre, Schumann, Mueller & Larson, P.C.

(57) ABSTRACT

An optical switching system and method that provide fault tolerant optical switching without duplicating the entire system. Two optical switches are provided, each of which receives a portion of a transmitted optical signal. Should one switch fail, the other switch is still able to perform the required optical routing of the optical signal to the desired receiving node. The two switches can be the same type of optical switch that have identical switching functionality, or each switch could have a distinct switching functionality. In one example, one switch could be a semiconductor optical amplifier (SOA) switch that has fast switching speed but uses more power, and the other switch could be a micro electro-mechanical systems (MEMS) switch that has slower switching speed but uses less power, thereby combining the benefits of fast switching and low power switching into a single architecture.

15 Claims, 5 Drawing Sheets

OPTICAL SWITCHING SYSTEMS AND METHODS

FIELD

This disclosure relates to an optical switched interconnect and systems employing optical switching.

BACKGROUND

The use of optical switching in an optical system is known. The optical switching is used to route an optical signal transmitted by a node to a desired receiving node. When fault tolerance in the system is desired, it is known to duplicate the entire system, with an optical signal being transmitted on different channels, with one optical switch receiving the optical signal on one channel and a second optical switch receiving the optical signal on a second channel.

Existing optical switching solutions typically are either fast, for example in the case of semiconductor optical amplifiers or SOAs, or low power, for example in the case of micro electro-mechanical systems or MEMS, but not both fast and low power.

SUMMARY

Optical switching systems and methods are described that provide fault tolerant optical switching without duplicating the entire system. In addition, in one disclosed example, the benefits of fast switching and low power switching are combined into a single architecture.

Two optical switches are provided, each of which receives a portion of a transmitted optical signal. Should one switch fail, the other switch is still able to perform the required optical routing of the optical signal to the desired receiving node. The two switches can be the same type of optical switch that have identical switching functionality. Alternatively, the two switches can be different types of optical switches that have distinct switching functionality from one another. For example, one switch can have a faster switching speed, but use higher power, than the other optical switch which operates more slowly but at lower power. Examples of optical switches that can be used include, but are not limited to, a semiconductor optical amplifier (SOA) switch that has fast switching speed but uses more power, and a micro electro-mechanical systems (MEMS) switch that has slower switching speed but uses less power.

In one disclosed embodiment, an optical switching system includes a plurality of transmit nodes, with each transmit node including an optical transmitter capable of transmitting an optical signal. In addition, an optical signal splitter is connected to each optical transmitter, with each optical signal splitter being configured to split an optical signal received from the respective optical transmitter into a first optical signal portion and a second optical signal portion. A first optical switch is provided that includes a plurality of first inputs connected to the optical signal splitters and receiving therefrom the first optical signal portions, and a plurality of first outputs, with each of the first inputs being selectively connectable to each of the first outputs. A second optical switch is also provided that includes a plurality of second inputs connected to the optical signal splitters and receiving therefrom the second optical signal portions, and a plurality of second outputs, with each of the second inputs being selectively connectable to each of the second outputs. A plurality of optical signal combiners are also provided, with each optical signal combiner being connected to one of the first outputs and one of the second outputs. In addition, a plurality of receive nodes are connected to the optical signal combiners, with each receive node including an optical receiver capable of receiving an optical signal.

In another disclosed embodiment, an optical switching system includes a plurality of optical transmitters each capable of transmitting an optical signal. A first optical switch is provided that includes a plurality of first inputs connected to the optical transmitters and receiving first optical signal portions, and a plurality of first outputs, where each of the first inputs is selectively connectable to each of the first outputs. A second optical switch is also provided that includes a plurality of second inputs connected to the optical transmitters and receiving second optical signal portions, and a plurality of second outputs, where each of the second inputs is selectively connectable to each of the second outputs. Further, a plurality of optical receivers are connected to the first outputs and the second outputs. In this embodiment, the first optical switch has a faster switching speed than the second optical switch, and the second optical switch uses less power than the first optical switch.

A method of providing fault tolerant optical switching includes directing a first portion of a transmitted optical signal to an input of a first optical switch that has a plurality of outputs, directing the first portion of the transmitted optical signal from the input of the first optical switch to a selected one of the outputs of the first optical switch, directing a second portion of the transmitted optical signal to an input of a second optical switch that has a plurality of outputs, and directing the second portion of the transmitted optical signal from the input of the second optical switch to a selected one of the outputs of the second optical switch.

If one of the optical switches fails, then the other optical switch can provide optical signal routing. Alternatively, the first optical switch can be disabled (i.e. turned off, shut down, etc.) once the second optical switch has directed the second portion of the transmitted optical signal from the input thereof to the selected one of the outputs thereof, so that only one of the switches remains in operation. This helps to reduce power consumption.

DRAWINGS

DETAILED DESCRIPTION

A fault tolerant optical switching system is described that provides fault tolerant optical switching. In addition to fault tolerance, the system combines the benefits of fast switching and low power switching into a single architecture.

Figure 1:
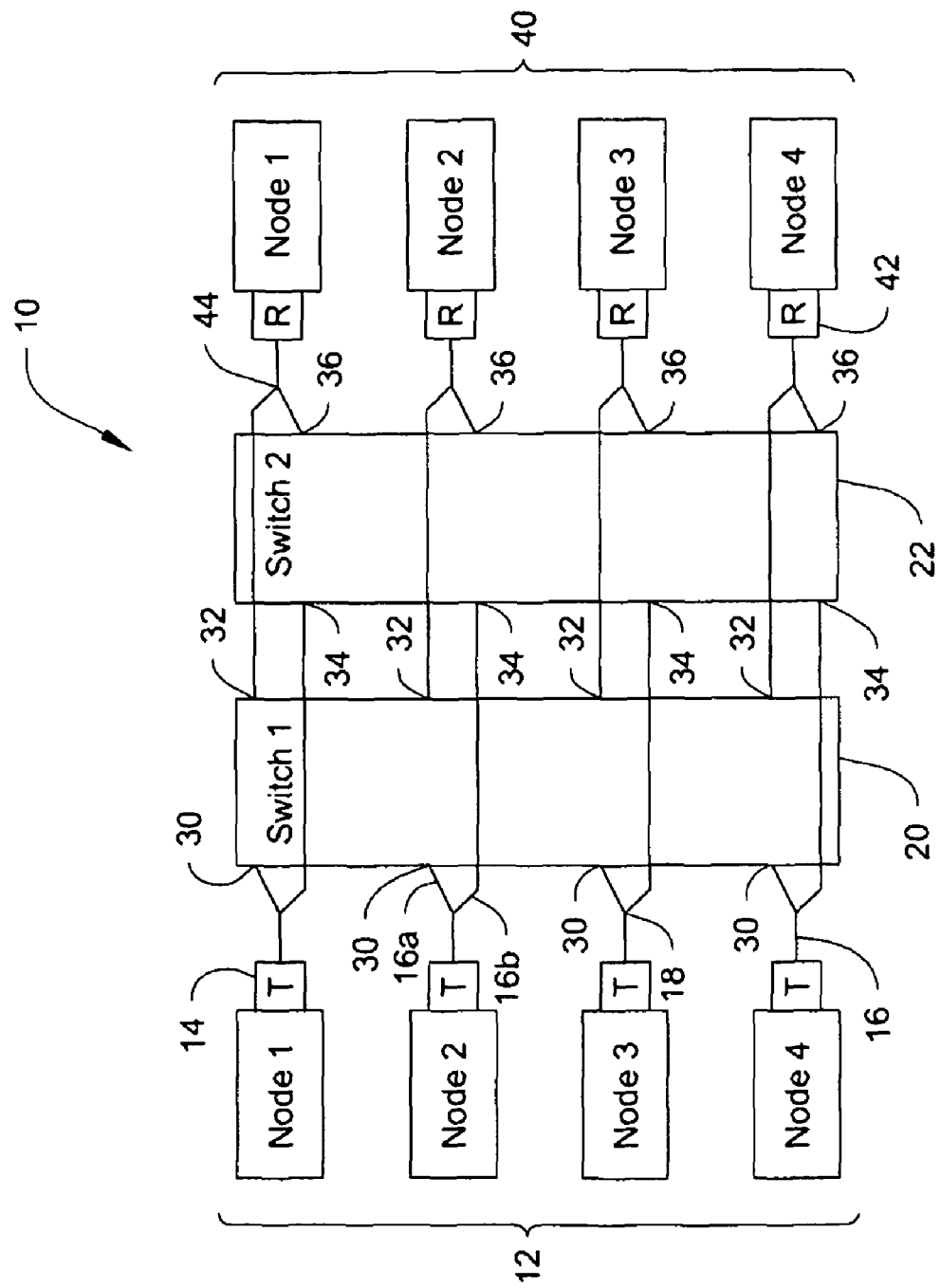
FIG. 1 illustrates an optical switching system as described herein.
Figure 2:
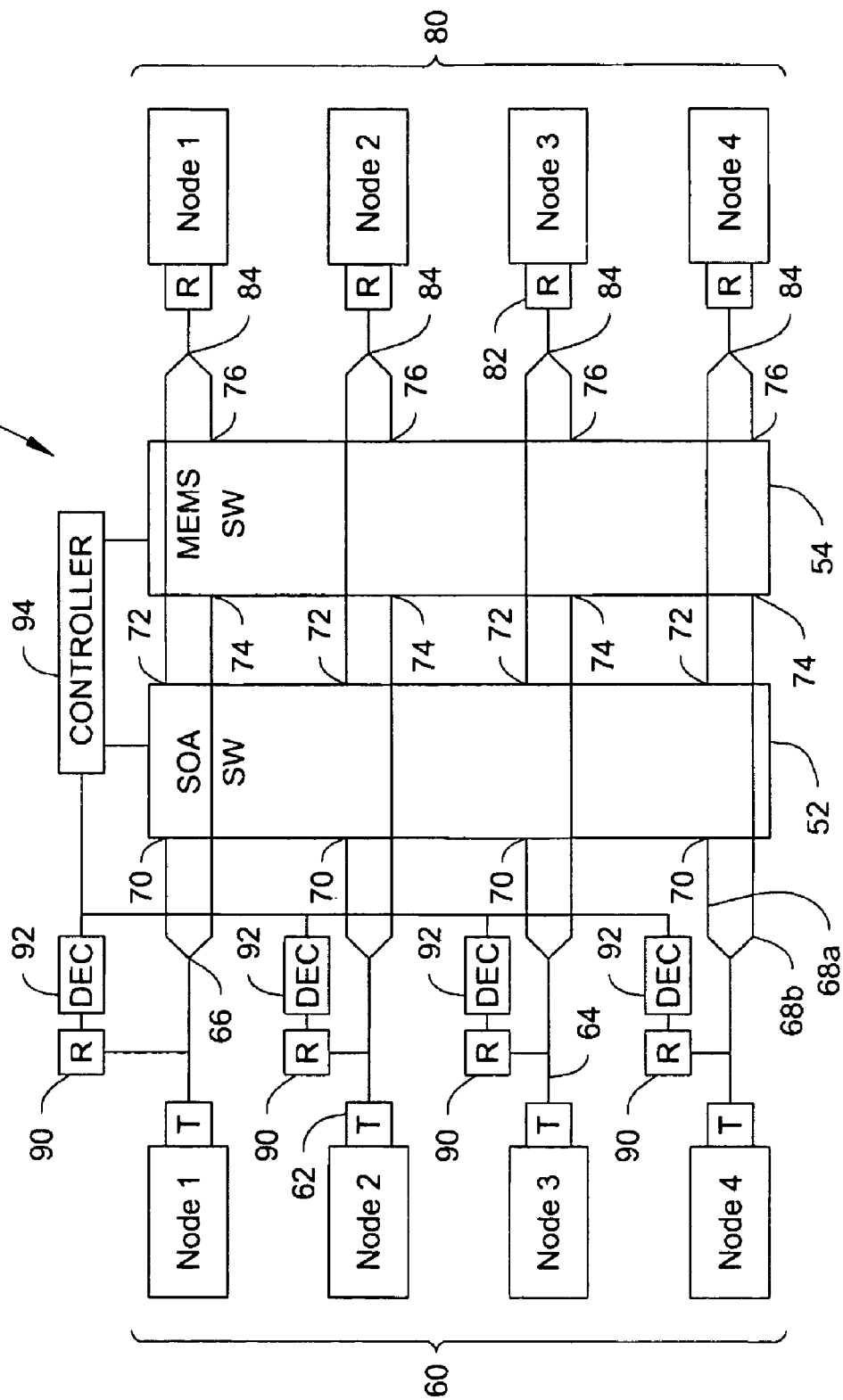
FIG. 2 illustrates an example of an optical switching system employing an SOA and a MEMS.

With reference to FIG. 1, an optical switching system 10 includes a plurality of transmit, single channel nodes 12 (labeled Node 1, Node 2, Node 3 and Node 4) each of which includes an optical transmitter 14 capable of transmitting an optical signal 16 on a single channel. Optical signal splitters 18 receive the transmitted optical signals and split the transmitted signal 16 into two half-power signal portions 16a, 16b.

A first optical switch 20 and a second optical switch 22 are provided to receive the signal portions 16a, 16b. The first and second optical switch 20, 22 can be any optical switches that can receive an optical signal and route the received optical signal to a desired output of the optical switch. The two switches 20, 22 can be the same type of optical switch that have identical switching functionality. For example, each switch 20, 22 could be, for example, a SOA, MEMS, or other type of optical switch.

Alternatively, the two switches 20, 22 can be different types of optical switches that have distinct switching functionality from one another, which is discussed further below with respect to FIGS. 2-5. For example, the switch 20 can have a faster switching speed, but use higher power, for example a SOA, than the other optical switch 22 which operates more slowly but at lower power, for example a MEMS.

The switch 20 includes a plurality of optical inputs 30 connected to the optical signal splitters 18 and receiving the first optical signal portions 16a. The switch 20 also includes a plurality of optical outputs 32. Each input 30 is selectively connectable to any one of the outputs 32 so that the signal portion 16a received by an input 30 can be routed to any one of the outputs 32. As would be understood by a person of ordinary skill in the art, the switching of the switch 20 (and of the switch 22) would be controlled by suitable control logic based on the intended destination of the signal 16.

Likewise, the second optical switch 22 includes a plurality of optical inputs 34 connected to the optical signal splitters 18 and receiving therefrom the second optical signal portions 16b. The switch 22 also includes a plurality of optical outputs 36. Each input 34 is selectively connectable to each of the outputs 36 so that the signal portion 16b received by an input 34 can be routed to any one of the outputs 36.

Downstream of the switches 20, 22 are a plurality of receive nodes 40 (labeled Node 1, Node 2, Node 3 and Node 4). Each receive node 40 includes an optical signal receiver 42 capable of receiving an optical signal. Optical signal combiners 44 are connected to the receivers 42 and to one of the outputs 32 of the switch 20 and one of the outputs 36 of the switch 22. The optical signal combiners 44 can receive both signal portions 16a, 16b and combine them back into the transmitted signal 16 which is then input into the respective receiver 42 of the receive node 40.

In the system 10, if one of the switches 20, 22 fails, the system is still able to route the optical signal to the appropriate receive node 40. However, the receive node would receive only half of the originally transmitted signal 16, i.e. either signal portion 16a or 16b depending upon which switch fails. The sensitivity of the receivers 42 is such as to allow receipt of the combined signal portions 16a, 16b or just an individual signal portion 16a, 16b.

Although four transmit nodes and four receive nodes are illustrated, the system 10 could be implemented with a larger or smaller number of transmit and receive nodes. In addition, although the transmit nodes are described as having transmitters 14 and the receive nodes as having receivers 42, transceivers could be used in place of the transmitters and/or the receivers to allow the transmit nodes and the receive nodes to transmit and receive.

Turning to FIGS. 2-5, a fault tolerant optical switching system 50 is illustrated that utilizes different types of optical switches 52, 54 that have distinct switching functionality from one another. The system 50 includes a plurality of transmit, single channel nodes 60 (labeled Node 1, Node 2, Node 3 and Node 4) each of which includes an optical transmitter 62 capable of transmitting an optical signal 64 on a single channel. Optical signal splitters 66 receive the transmitted optical signals and split the transmitted signal 64 into two half-power signal portions 68a, 68b.

The first optical switch 52 and the second optical switch 54 receive the signal portions 68a, 68b. In the illustrated example, the first optical switch 52 is a SOA switch while the second optical switch 54 is a MEMS switch. Thus, the switch 52 has faster switching speed, but uses higher power, compared to the MEMS switch 54, while the MEMS switch operates more slowly but at lower power.

The switch 52 includes a plurality of optical inputs 70 connected to the optical signal splitters 66 and receiving the first optical signal portions 68a. The switch 52 also includes a plurality of optical outputs 72. Each input 70 is selectively connectable to each of the outputs 72 so that the signal portion 68a received by an input 70 can be routed to any one of the outputs 72.

Likewise, the switch 54 includes a plurality of optical inputs 74 connected to the optical signal splitters 66 and receiving therefrom the second optical signal portions 68b. The switch 54 also includes a plurality of optical outputs 76. Each input 74 is selectively connectable to each of the outputs 76 so that the signal portion 68b received by an input 74 can be routed to any one of the outputs 76.

A plurality of receive nodes 80 (labeled Node 1, Node 2, Node 3 and Node 4) are downstream of the switches 52, 54. Each receive node 80 includes an optical signal receiver 82 capable of receiving an optical signal. Optical signal combiners 84 are connected to the receivers 82 and to one of the outputs 72 of the switch 52 and one of the outputs 76 of the switch 54. The optical signal combiners 84 can receive both si portions 68a, 68b and combine them back into the transmitted signal 64 which is then input into the respective receiver 82 of the receive node 80.

Figure 3:
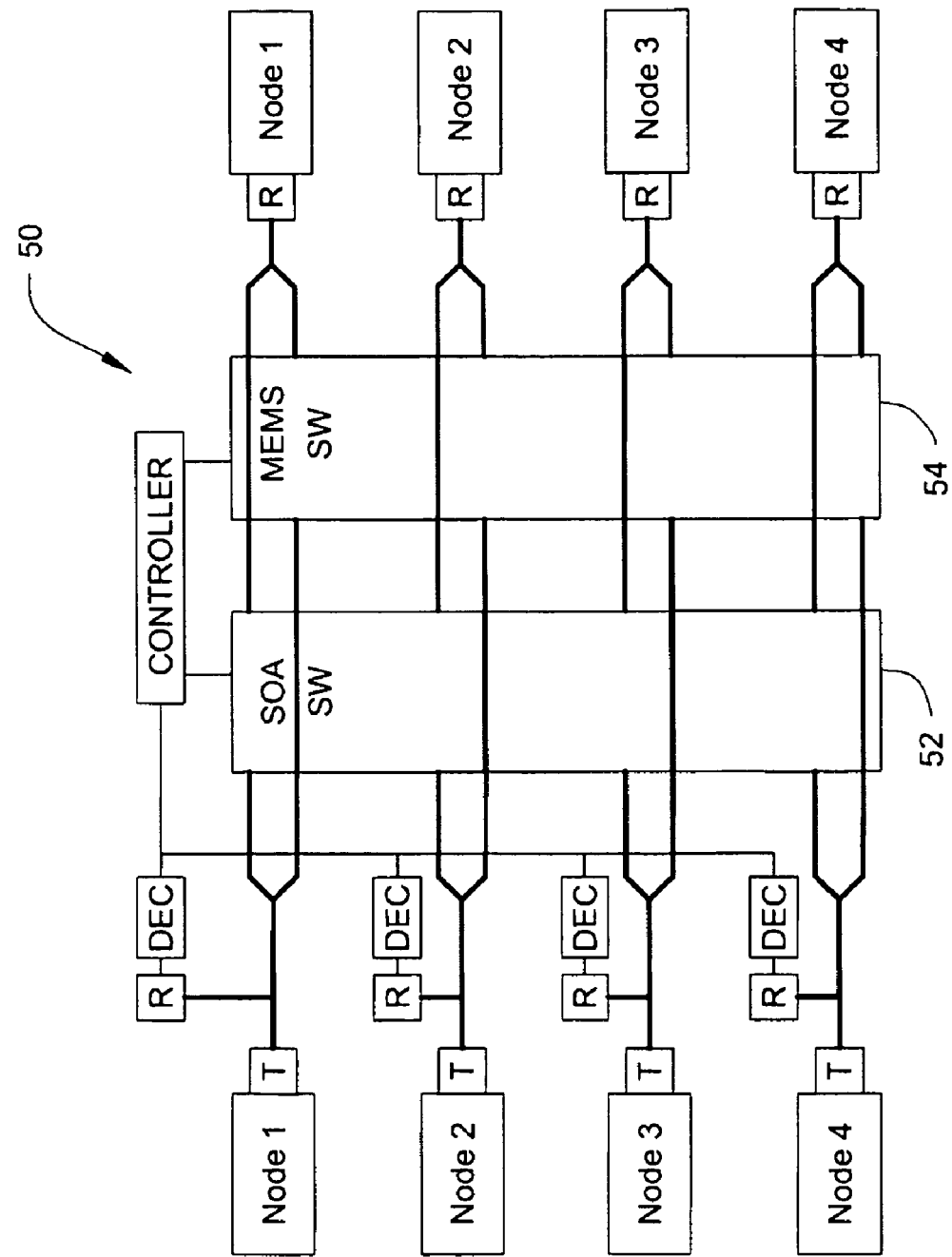
FIG. 3 illustrates the system of FIG. 2 showing which connections are optical and which are electrical.

The system 50 also includes a plurality of optical-to-electrical receivers 90, each of which is connected between an associated one of the optical transmitters 62 and the corresponding optical signal splitter 66. The receivers 90 receive the optical signals 64 from the transmitters 62, convert the optical signals to electrical signals, and send the electrical signals to decoders 92. The decoders 92 decode the electrical signals, which carry instructions indicating which nodes the switches 52, 54 should route the optical signals 64 to. FIG. 3 illustrates the connections that are optical connections (shown in heavy line) and the connections that are electrical connections (shown in lighter line).

Control logic is connected to each decoder 92 and to the switches 52, 54 for controlling the switches based on the decoded instructions. The control logic can be located at any suitable location to allow the control logic to perform the control functions on the switches 52, 54. For example, as illustrated in FIGS. 2-5, the control logic can be provided in a controller 94 that is separate from the decoders 92 and the switches 52, 54. The controller 94 receives inputs from all of the decoders 92 for appropriate control of the switches 52, 54. Alternatively, the control logic can be embedded in each decoder 92, or the control logic can be embedded in one of the decoder 92, with the rest of the decoders being connected to the decoder containing the control logic.

Figure 4:
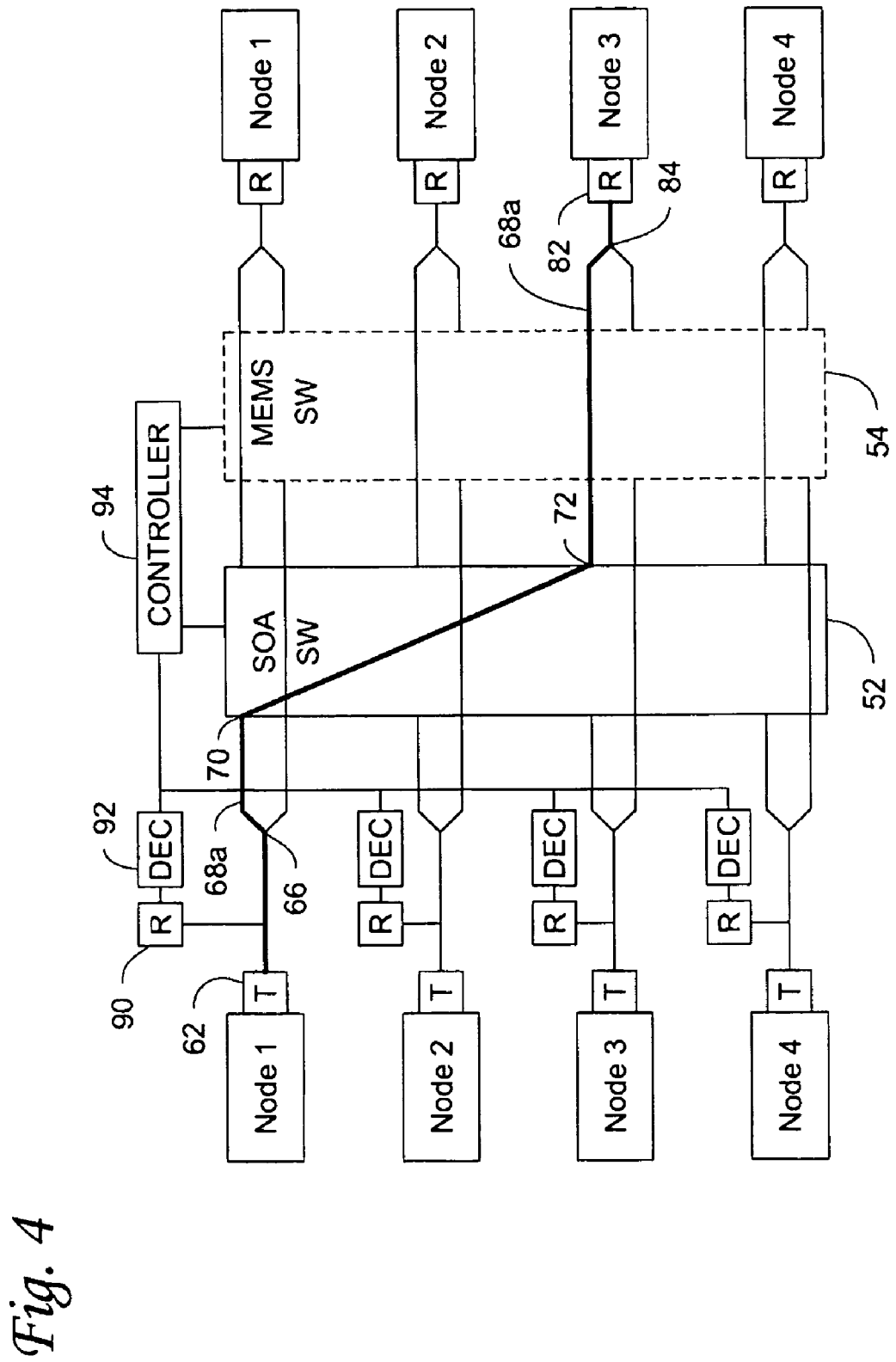
FIG. 4 illustrates an exemplary use of the system of FIG. 2 for directing an optical data packet signal originating from transmit Node 1 to receive Node 3, with the SOA switch operational.
Figure 5:
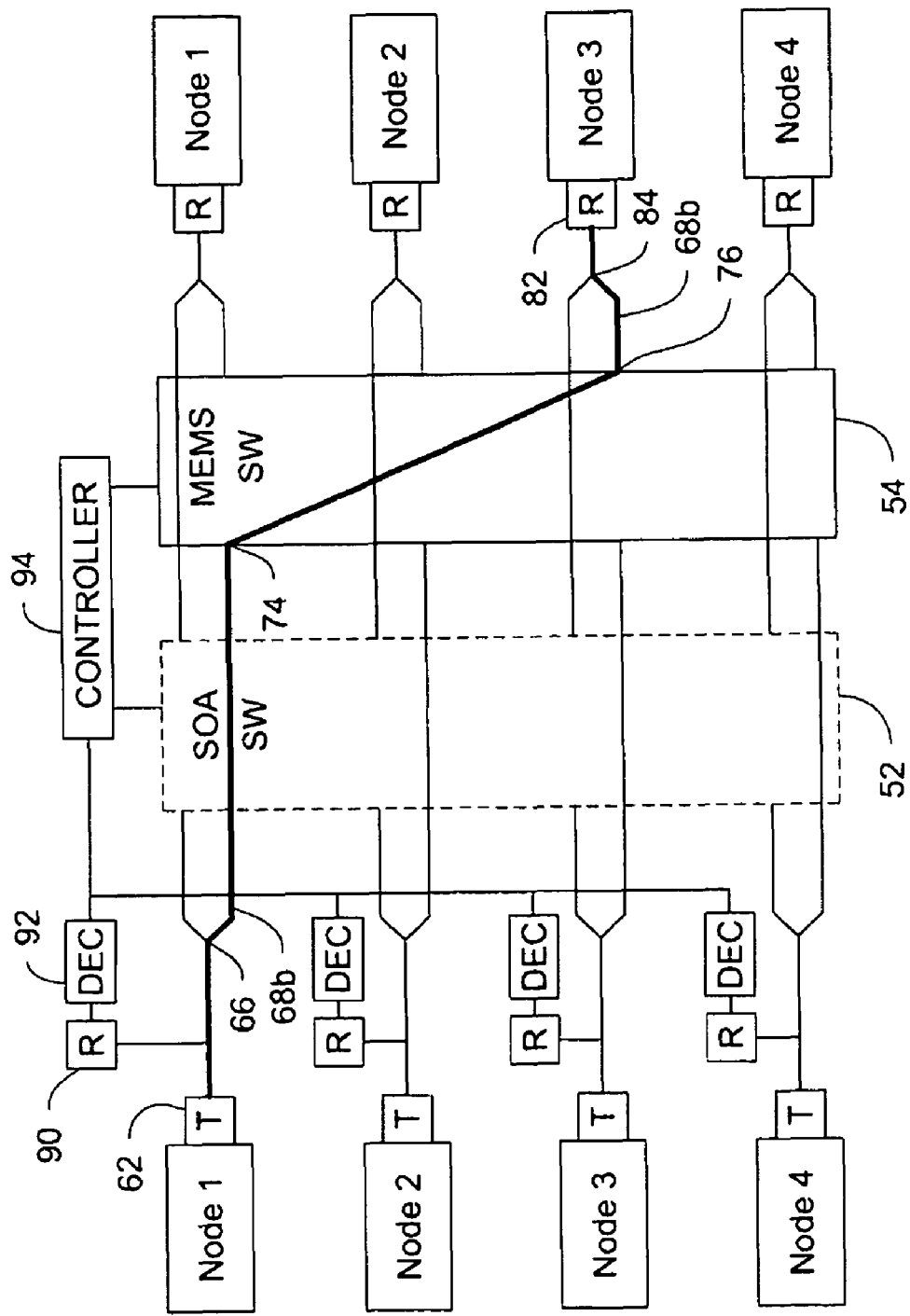
FIG. 5 is similar to FIG. 4 but shows the MEMS switch operational with the SOA switch disabled.

With reference to FIGS. 4 and 5, an exemplary operation of the system 50 is shown. The transmitter 62 of Node 1 transmits an optical signal intended for receive Node 3. The signal is received by the O/E receiver 90 which converts the optical signal to an electrical signal, and sends the electrical signal to the decoder 92. The decoder decodes the electrical signal to determine which receive node the transmitted optical signal is to be routed to. The transmitted optical signal is also split by the splitter 66 into the first and second signal portions. The control logic in controller 94 receives a signal from the decoder 92, and controls the switches 52, 54 to begin routing the optical signal to receive Node 3.

As indicated in FIG. 4, because the SOA switch 52 has fast switching speed, it switches first so as to route the signal portion 68a from the Node 1 input 70 to the Node 3 output 72 of the switch 52. The signal portion 68a is then passed through the combiner 84 and is received by the receiver 82 of receive Node 3.

At the same time that the SOA switch 52 switches, the MEMS switch 54 is switching. Since the MEMS switch 54 is slower, it takes longer to complete the switch. Ultimately, as shown in FIG. 5, the MEMS switch 54 will complete its switch so as to route the signal portion 68b from the Node 1 input 74 to the Node 3 output 76 of the switch 54. The signal portion 68b is then passed through the combiner 84 and is received by the receiver 82 of receive Node 3.

Although not illustrated, there will be a brief period of time where both the SOA switch 52 and the MEMS switch 54 will route the respective signal portions 68a, 68b to receive Node 3, in which case the combiner 84 will combine the signal portions 68a, 68b into a single signal. However, once the MEMS switch 54 has completed the switch, the SOA switch 52 can be instructed by the control logic to turn off to conserve power. The configuration shown in FIG. 5 is thus achieved where only the signal portion 68b is passed to receive Node 3. The sensitivity of the receiver 82 is such that it is still able to detect the half-power signal portion 68b.

In the event that either one of the switches 52, 54 fails, the remaining switch is able to take-over the switching duties for the entire system 50. Therefore, the system 50 is fault tolerant so that failure of one of the switches does not take down the entire system.

Although four transmit nodes and four receive nodes are illustrated, the system 50 could be implemented with a larger or smaller number of transmit and receive nodes. In addition, although the transmit nodes are described as having transmitters and the receive nodes as having receivers, transceivers could be used in place of the transmitters and/or the receivers to allow the transmit nodes and the receive nodes to transmit and receive.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical switching system, comprising:
 a plurality of transmit nodes, each transmit node includes an optical transmitter capable of transmitting an optical signal that carries data;
 an optical signal splitter connected to each optical transmitter, each optical signal splitter is configured to split an optical signal received from the respective optical transmitter into a first optical signal portion and a second optical signal portion, the first and second optical signal portions carrying the same data;
 a first optical switch including a plurality of first inputs connected to the optical signal splitters and receiving therefrom the first optical signal portions, and a plurality of first outputs, each of the first inputs is selectively connectable to each of the first outputs;
 a second optical switch including a plurality of second inputs connected to the optical signal splitters and receiving therefrom the second optical signal portions, and a plurality of second outputs, each of the second inputs is selectively connectable to each of the second outputs;
 the first optical switch has a faster switching speed than the second optical switch, and the second optical switch uses less power than the first optical switch;
 a plurality of optical signal combiners, each optical signal combiner is connected to one of the first outputs and one of the second outputs; and
 a plurality of receive nodes connected to the optical signal combiners, each receive node includes an optical receiver capable of receiving an optical signal.

2. The optical switching system of claim 1, wherein the first optical switch is a semiconductor optical amplifier switch, and the second optical switch is a micro electro-mechanical systems switch.

3. The optical switching system of claim 1, further comprising an optical-to-electrical receiver connected between each optical transmitter and the corresponding optical signal splitter, and a decoder connected to each optical-to-electrical receiver.

4. The optical switching system of claim 3, further comprising control logic connected to each decoder, and the control logic is also connected to the first optical switch and the second optical switch.

5. An optical switching system, comprising:
 a plurality of optical transmitters each capable of transmitting an optical signal;
 a first optical switch including a plurality of first inputs connected to the optical transmitters and receiving first optical signal portions, and a plurality of first outputs, each of the first inputs is selectively connectable to each of the first outputs;
 a second optical switch including a plurality of second inputs connected to the optical transmitters and receiving second optical signal portions, and a plurality of second outputs, each of the second inputs is selectively connectable to each of the second outputs;
 the first optical switch has a faster switching speed than the second optical switch, and the second optical switch uses less power than the first optical switch; and
 a plurality of optical receivers connected to the first outputs and the second outputs;
 in the event that the first optical switch or the second optical switch fails, the remaining optical switch is able to take-over switching duties for the entire optical switching system.

6. The optical switching system of claim 5, wherein the first optical switch is a semiconductor optical amplifier switch, and the second optical switch is a micro electro-mechanical systems switch.

7. The optical switching system of claim 5, further comprising an optical-to-electrical receiver connected to each optical transmitter, and a decoder connected to each optical-to-electrical receiver.

8. The optical switching system of claim 7, further comprising control logic connected to each decoder, and the control logic is also connected to the first optical switch and the second optical switch.

9. A method of providing fault tolerant optical switching, comprising:
 directing a first portion of a transmitted optical signal to an input of a first optical switch that has a plurality of outputs;

directing the first portion of the transmitted optical signal from the input of the first optical switch to a selected one of the outputs of the first optical switch;

directing a second portion of the transmitted optical signal to an input of a second optical switch that has a plurality of outputs, the first optical switch has a faster switching speed than the second optical switch, and the second optical switch uses less power than the first optical switch; and directing the second portion of the transmitted optical signal from the input of the second optical switch to a selected one of the outputs of the second optical switch;

in the event of a failure of either one of the first optical switch or the second optical switch, the remaining optical switch is able to take-over switching duties for the failed optical switch.

10. The method of claim 9, comprising disabling the first optical switch once the second optical switch has directed the second portion of the transmitted optical signal from the input thereof to the selected one of the outputs thereof.

11. The method of claim 9, comprising splitting the transmitted optical signal into the first portion and the second portion each of which carries the same data.

12. The method of claim 9, comprising directing the first portion of the transmitted optical signal from the selected one of the outputs of the first optical switch and/or directing the second portion of the transmitted optical signal from the selected one of the outputs of the second optical switch to an optical receiver.

13. The method of claim 9, comprising sensing the transmitted optical signal, converting the transmitted optical signal into an electrical signal, decoding the electrical signal, and using the decoded electrical signal to control operation of the first optical switch and the second optical switch.

14. The method of claim 9, wherein the first optical switch is a semiconductor optical amplifier switch, and the second optical switch is a micro electro-mechanical systems switch.

15. The optical switching system of claim 5, wherein one of the first optical signal portions and one of the second optical signal portions are derived from an optical signal transmitted by a respective one of the optical transmitters that is split into the one first optical signal portion and the one second optical signal portion that carry the same data.

* * * * *